United States Patent
Kaczur et al.

Patent Number: 5,391,268
Date of Patent: Feb. 21, 1995

[54] ELECTROCHEMICAL PROCESS FOR THE REMOVAL OF RESIDUAL NITRIC ACID FROM AQUEOUS HYDROXYLAMMONIUM NITRATE

[75] Inventors: Jerry J. Kaczur; Kenneth E. Woodard, Jr.; David W. Cawlfield; Elizabeth K. Muse, all of Cleveland, Tenn.

[73] Assignee: Olin Corporation, Cheshire, Conn.

[21] Appl. No.: 278,527

[22] Filed: Jul. 20, 1994

[51] Int. Cl.$^6$ .............. C25B 1/02; B01D 61/00
[52] U.S. Cl. ................... 204/102; 204/103; 204/130; 204/131; 204/182.4
[58] Field of Search ........... 204/102, 130, 182.4, 204/103, 131

[56] References Cited

U.S. PATENT DOCUMENTS

| | | | |
|---|---|---|---|
| 4,567,206 | 1/1986 | Matsui et al. | 521/27 |
| 4,659,744 | 4/1987 | Matsui et al. | 521/32 |
| 4,661,231 | 4/1987 | Matsui et al. | 204/252 |
| 4,849,073 | 7/1989 | Dotson et al. | 204/101 |
| 4,851,125 | 7/1989 | Dotson et al. | 210/638 |
| 4,889,704 | 12/1989 | Fuchs et al. | 423/387 |
| 4,956,168 | 9/1990 | Wagaman | 423/386 |
| 4,968,394 | 11/1990 | Dotson et al. | 204/101 |
| 5,062,966 | 11/1991 | Dotson et al. | 210/753 |
| 5,213,784 | 5/1993 | Cawlfield | 423/387 |
| 5,266,290 | 11/1993 | Levinthal et al. | 423/387 |
| 5,306,400 | 4/1994 | Bradbury et al. | 204/101 |

FOREIGN PATENT DOCUMENTS 2211858 7/1989 United Kingdom .

Primary Examiner—John Niebling
Assistant Examiner—Arun S. Phasge
Attorney, Agent, or Firm—Dale L. Carlson

[57] ABSTRACT

The present invention relates to an electrochemical process for the removal of excess or residual nitric acid from aqueous hydroxylammonium nitrate (HAN) solutions. The process utilizes a multi-compartment electrochemical membrane cell in which the HAN solution flows through a central ion exchanging compartment bounded by anion membranes on either side. Electrochemically generated OH-ions formed at the cathode are used to displace and remove the nitric acid from the HAN solution. In use, the residual nitric acid content in the HAN is suitably reduced to a specified safe level before the HAN is concentrated to a 13.0 molar final composition.

22 Claims, 3 Drawing Sheets

ELECTROCHEMICAL PROCESS FOR THE REMOVAL OF RESIDUAL NITRIC ACID FROM AQUEOUS HYDROXYLAMMONIUM NITRATE

Statement as to Rights to Inventions Made Under Federally-Sponsored Research and Development The U.S. Government has rights in this invention pursuant to Contract No. DAAA 89-C-0011 awarded by the Department of Army. Under these contracts, the U.S. Government has certain rights to practice or have practiced on its behalf the invention claimed herein without payment of royalties.

FIELD OF THE INVENTION

This invention relates generally to the production of hydroxylammonium nitrate ("HAN"), and, more specifically, to an electrochemical process far removing residual nitric acid from electrochemically-produced HAN.

Background of the Invention

HAN is employed in the purification of plutonium metal, as one component of a liquid propellant, and as a reducing agent in photographic applications. In some of these applications, a highly pure form of HAN is required.

There are two key methods for producing HAN. One method employs a chemical process, as illustrated by the disclosures of U.S. Pat. Nos. 5,213,784 and 5,266,290. As pointed at column 2, lines 8-12 of the '784 patent, a chemical process for producing HAN can avoid the problems associated with excess nitric acid in the product HAN since such process produces highly concentrated HAN without excess nitric acid while using only one mole of nitric acid per mole of HAN produced (see column 2, lines 40-43 of the '784 patent.

The other key method for producing HAN is by means of an electrochemical process, such as that disclosed in U.S. Pat. No. 4,849,073. Electrochemical HAN production processes tend to result in a product mixture which contains excess nitric acid, as disclosed, for example, at column 4, lines 61-65 of the '073 patent. The '073 patent teaches methodology for effecting removal of the excess nitric acid from the HAN product solution by contacting the product solution with a basic anion exchange resin (see column 4, lines 64-68 of the '073 patent). Suitable anion exchange resins are said to be those that neutralize excess nitric acid without decomposing or with minimal decomposition of the HAN product. One disadvantage of this nitric acid removal process is that the anionic exchange resin itself tends to introduce unwanted trace transition metal contamination into the HAN. Another disadvantage with this removal method is the typical requirement for very large amounts of regeneration chemicals in order to backflush the exchange resin to regenerate (for reuse) the removed nitric acid that is bound to the exchange resin. In addition, a dilute water backflush/rinse waste stream is typically produced using such a backflush procedure, and new waste streams are undesirable from an environmental standpoint. A further problem results from the need to recycle or dispose of these backflush-/rinse (i.e., regenerant) waste streams. Disposal of the regenerant waste streams typically entails a loss of valuable nitric acid that is present in the waste streams.

For at least the above reasons, the HAN manufacturing community faces the problem of how to remove and recover excess nitric acid from HAN, especially electrochemically-produced HAN, without encountering losses of the nitric acid and without generating unwanted nitric acid waste streams. The present invention presents one solution to this problem.

SUMMARY OF THE INVENTION

In one aspect, the present invention relates to a process for electrolytically removing excess nitric acid from an aqueous hydroxylammonium nitrate solution containing an excess of nitric acid to form a nitric acid-depleted hydroxylammonium nitrate solution in an electrolytic cell having an anolyte compartment comprising an anode and an anolyte solution, a catholyte compartment comprising a cathode and aqueous catholyte solution, and at least one ion exchange compartment between the anode compartment and the cathode compartment, with the provisos that said catholyte compartment is separated from said ion-exchanging compartment by means of an anion permeable membrane and that said anolyte compartment is separated from said ion exchange compartment by a separator, which can be another anion permeable membrane, which comprises:

(a) feeding said aqueous hydroxylammonium nitrate solution containing excess nitric acid into said ion-exchanging compartment, (b) electrolyzing said catholyte solution to produce hydroxyl ions in said catholyte compartment, (c) electrolyzing said anolyte solution to produce hydrogen ions in said anolyte compartment, (d) electrolytically passing said hydroxyl ions from said catholyte compartment through said anion permeable membrane into said ion exchange compartment and reacting said hydroxyl ions with said excess nitric acid to form water and nitrate ions, (e) electrolytically passing said nitrate ions from said ion exchange compartment through said separator into said anolyte compartment and combining said nitrate ions with said hydrogen ions to form nitric acid in said anolyte compartment, and (f) forming a nitric acid-depleted aqueous hydroxylammonium nitrate solution in said ion exchange compartment and removing said nitric acid-depleted aqueous hydroxylammonium nitrate solution from said ion exchange compartment.

In another aspect, the present invention relates to carrying out the above process in a single pass system or multiple pass recirculation system (e.g., recirculating stream loop) to provide a continuous process for removing by-product nitric acid from HAN for reuse of the nitric acid in a chemical or electrochemical reaction, as desired.

In yet another aspect, the present invention relates to a batch or continuous process for electrolytically removing nitric acid from a mixture of an aqueous solution of hydroxylammonium nitrate containing excess nitric acid in an electrolytic cell having an anode compartment, a cathode compartment, and at least one central ion exchange compartment between the anode compartment and the cathode compartment, which comprises feeding said mixture into the central ion exchange compartment, electrolyzing an aqueous catholyte solution in the cathode compartment to generate hydroxyl ions, electrolyzing an anolyte solution in the anode compartment to generate hydrogen ions, electrolytically passing the hydroxyl ions from said cathode compartment through an anion permeable membrane into the central ion exchange compartment and reacting said hydroxyl ions with nitric acid in said mixture to form water and nitrate ions, electrolytically passing said nitrate ions from said ion exchange compartment through a separator into said anode compartment, and removing nitric acid-depleted hydroxylammonium nitrate from said central ion exchange compartment to provide a product containing a reduced amount of nitric acid.

These and other aspects will become apparent from a reading of the following detailed description of the invention.

DETAILED DESCRIPTION OF THE INVENTION

In accordance with the present invention, the present inventors have surprisingly discovered a facile process for electrochemically removing nitric acid from a nitric acid-containing composition, such as aqueous solutions of nitric acid-containing hydroxylammonium nitrate, as well as other aqueous solutions, dispersions or emulsions of water-soluble or water-insoluble compounds, such as, for example, propellants and/or explosives employing nitric acid in their manufacture and retaining, for potential recovery using the process of the present invention, at least some amount of nitric acid in the manufactured product. Thus, the process of the present invention is suitably employed to recover nitric acid from product mixtures containing nitric acid together with nitroguanidine, nitrocellulose, nitroglycerine, ammonium nitrate, combinations thereof, and the like. The process is suitably employed to remove and/or recover between about 5% and about 100% by weight of the total or excess nitric acid from a nitric acid-containing composition, and partial removal and/or recovery of the nitric acid is suitably combined with another nitric acid separation protocol (such as distillation, evaporation, extraction, or the like), if desired, to effect a more complete removal and/or recovery of nitric acid from the nitric acid-containing composition.

The process of the present invention employs an electrochemical cell divided into three compartments —an anolyte compartment (typically comprising an anode and an anolyte solution), a catholyte compartment (typically comprising a cathode and a catholyte solution), and at least one central ion-exchanging compartment situate between the anolyte compartment and the catholyte compartment. The ion-exchanging compartment is separated from the anolyte and catholyte compartments by at least one anion-permeable ion exchange membrane adjacent the catholyte compartment and at least one separator, which can be a diaphragm or an anion-permeable ion exchange membrane, adjacent the anolyte compartment.

The process of the present invention is particularly useful for the removal and recovery of excess nitric acid from electrochemically-produced HAN, enabling the removal of excess nitric acid from, for example, 2.8 molar HAN before concentrating the HAN to a desired 13 molar product for uses in formulating liquid propellants and the like. A surprising benefit of the process of the present invention is that the separated nitric acid is fully recyclable back to the electrochemical HAN production process. In contrast, nitric acid recovered by the prior art technique employing a basic anion exchange resin, as disclosed in U.S. Pat. No. 4,849,073 discussed above, is not easily recovered for recycle to the HAN production process.

Figure 1:
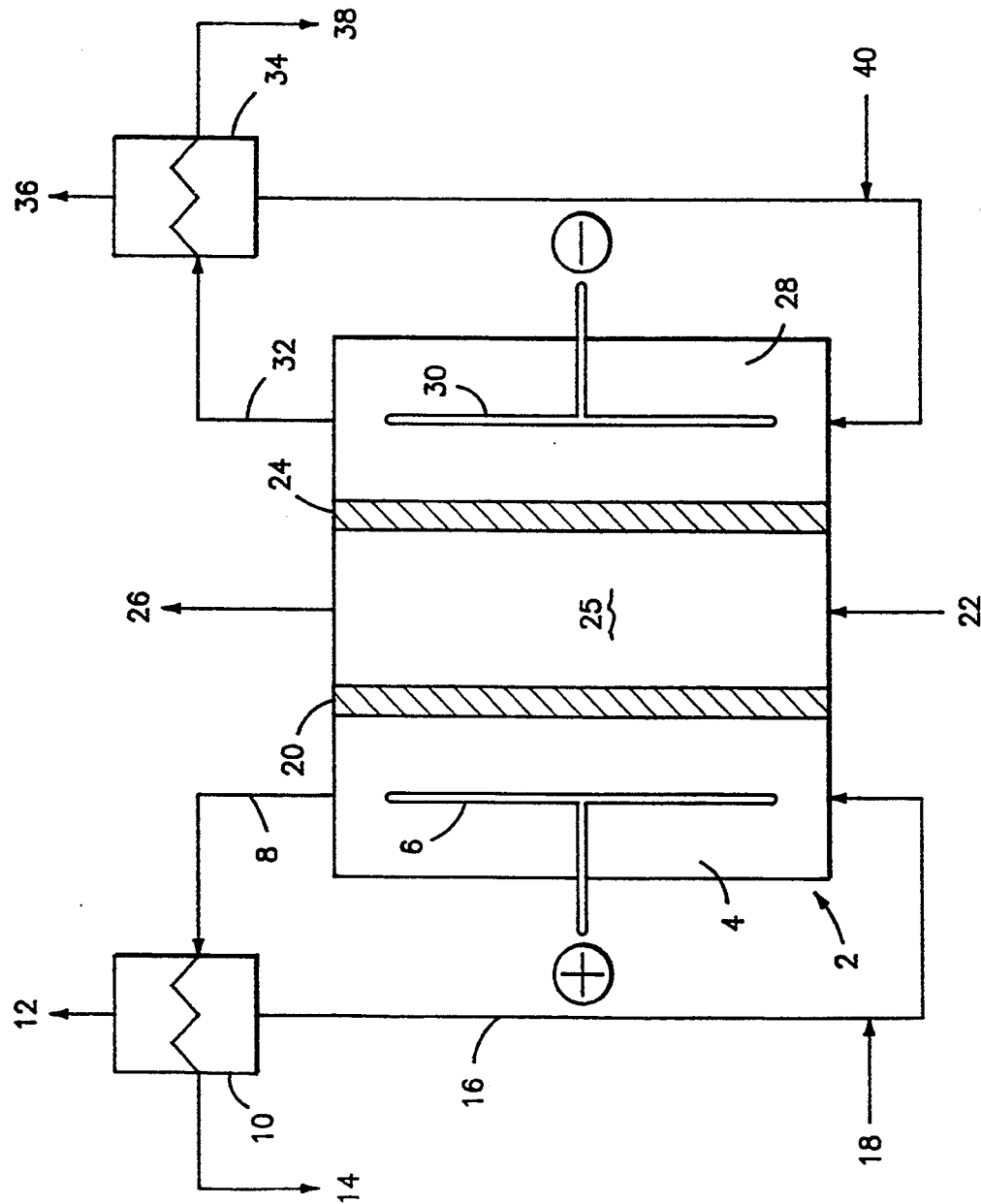
FIG. 1 illustrates a schematic cross sectional view of an electrolytic cell suitable for use with the novel process of the present invention.

The process of the present invention is more fully described by reference to the Figures. As shown in FIG. 1, electrolytic cell (2) comprises an anolyte compartment (4), a catholyte compartment (28), and a central ion exchanging compartment (25) situate therebetween.

The anolyte compartment (4) contains a solid, expanded or perforated anode (6) preferably having an oxygen evolution catalyst coating and optional support spacers (not shown) which also function as a gas disengagement zone as well as to provide dimensional placing of the anode (6) in the anolyte compartment (4). A separator (20), advantageously comprising an anion permeable membrane, is positioned between the anolyte compartment (4) and the central ion exchanging compartment (25). Advantageously, a plastic expanded mesh protector (not shown) is positioned between the anode (6) surface and the separator (20) to protect the separator (20), such as an anion permeable membrane, from direct physical oxidation attack by the reactions occurring on the anode (6).

The anolyte feed (18) to the anolyte compartment (4) is suitably deionized water or dilute or moderate concentrations of nitric acid in an aqueous nitric acid solution. The use of nitric acid solutions in the anolyte can help to decrease osmotic differentials between the anolyte and central compartment solutions across the separator (20), advantageously an anion exchanging membrane.

The water oxidation reaction at the anode (6) is as follows:

$$2H_2O \rightarrow O_2 + 4H^+ + 4e^- \qquad (3)$$

The nitrate ions ($NO_3^-$) entering the anode compartment (4) through the adjoining separator (20), which is advantageously an anion permeable membrane, from the central ion exchanging compartment (25) combine with the $H^+$ ions generated at the anode (6) to form a nitric acid product anolyte stream (8). The oxygen gas (12) evolved in the nitric acid product anolyte stream (8) is disengaged externally to the electrolytic cell (2) in an anolyte gas disengager (10) to also provide a nitric acid product stream (14) that is suitably recovered or replenished and recycled by means of a loop (16) back to the anolyte compartment (4).

The catholyte compartment (28) contains a solid, expanded or perforated cathode (30) and an optional support spacer (not shown) which also functions as a gas disengagement zone to provide dimensional placing of the cathode (30) in the compartment (28). A thin plastic mesh separator can be optionally positioned between the cathode (30) and the anion permeable membrane (24) positioned between the catholyte compartment (28) and the central ion exchanging compartment (25). The thickness of the support spacer (not shown) behind the cathode (30) can be used to position the cathode (30) directly against the anion permeable membrane (24).

The preferred feed to the catholyte compartment is deionized water. Upon electrolyzing of the contents of the aqueous catholyte cell, water is reduced at the cathode (30) to produce hydroxyl (OH−) ions and byproduct hydrogen by the reaction as follows:

$$2H_2O + 2e^- \rightarrow H_2 + 2OH^- \tag{1}$$

The hydroxyl ions migrate through the adjoining anion membrane (24) into the central ion exchanging compartment (25). The byproduct hydrogen gas produced in the catholyte compartment (28) exits the catholyte compartment (28) into an external catholyte gas disengager (34) to separate the hydrogen gas from the exit catholyte stream (32) to provide a hydrogen gas-containing stream (36) and a by-product stream (38) containing an aqueous dilute ammonium hydroxide solution suitable for recycle or reuse.

The central ion exchanging compartment (25), in a preferred embodiment, is bounded by separators (20,24) that are each anion permeable membranes. One or more expanded DUPONT trademarked TEFLON® brand fluoropolymer or chemically suitable (inert) plastic mesh spacers/distributors can be optionally positioned between the separator membranes (20,24) to form a flow channel and to provide for some mass transfer promoting flow turbulence in the central ion exchanging compartment (25).

A HAN feed solution (22) containing the excess residual nitric acid is introduced into the bottom of the ion exchanging compartment (25) and is evenly flow distributed through small distributor holes (not shown) into the central ion exchanging compartment (25). The excess nitric acid in the HAN is depleted as the solution flows upward in the compartment (25). The nitric acid depleted HAN solution (26) then exits through small distribution exit holes (not shown) at the top of the ion exchanging compartment (25) and then out from the electrolytic cell (2).

The hydroxyl (OH−) ions generated in the catholyte compartment (28) pass through the adjoining anion membrane (24) into the central ion exchanging compartment (25), combining with the free hydrogen ions of the fully dissociated nitric acid as follows:

$$H^+NO_3^- + OH^- \rightarrow H_2O + NO_3^- \tag{2}$$

Nitrate ions (NO$_3^-$) migrate in the potential field in the same direction as the hydroxyl ions, migrating through the adjoining separator (20), preferably being an anion permeable membrane, into the anolyte compartment (4) to combine with the generated H+ ions at the anode (6) to form nitric acid.

A small amount of HAN in the central ion exchanging compartment may pass through the anion membrane into the catholyte compartment as the hydroxylammonium cation and be reduced or decompose in the alkaline environment. This would form a dilute byproduct catholyte stream of ammonium hydroxide. A reaction for nitrate ions diffusing into the cathode compartment under low current density conditions forming ammonia is as follows:

$$NO_3^- + 6H_2O + 8e^- \rightarrow NH_3 + 9OH^- \tag{4}$$

Amounts of protonized hydroxylammonium nitrate can also be lost in the process by leakage into the cathode compartment as a positive charged molecule through the anion membrane, forming ammonia as follows:

$$NH_3OH^+ + OH^- \rightarrow NH_2OH + H_2O \tag{5a}$$

$$NH_2OH + H_2O + 2e^- \rightarrow NH_3 + 2OH^- \tag{5b}$$

The electrochemical efficiency of the central ion exchanging compartment for nitric acid removal depends on a number of factors such as the concentration of nitric acid in the HAN feed solution, solution flowrate through the compartment, the residence time of the solution in the compartment, the ion exchanging and hydrodynamic properties of the anion membranes, the concentrations of the ions in the anolyte and catholyte compartments, and the use of one or more ion exchanging compartments hydrolytically connected in series flow.

Figure 2:
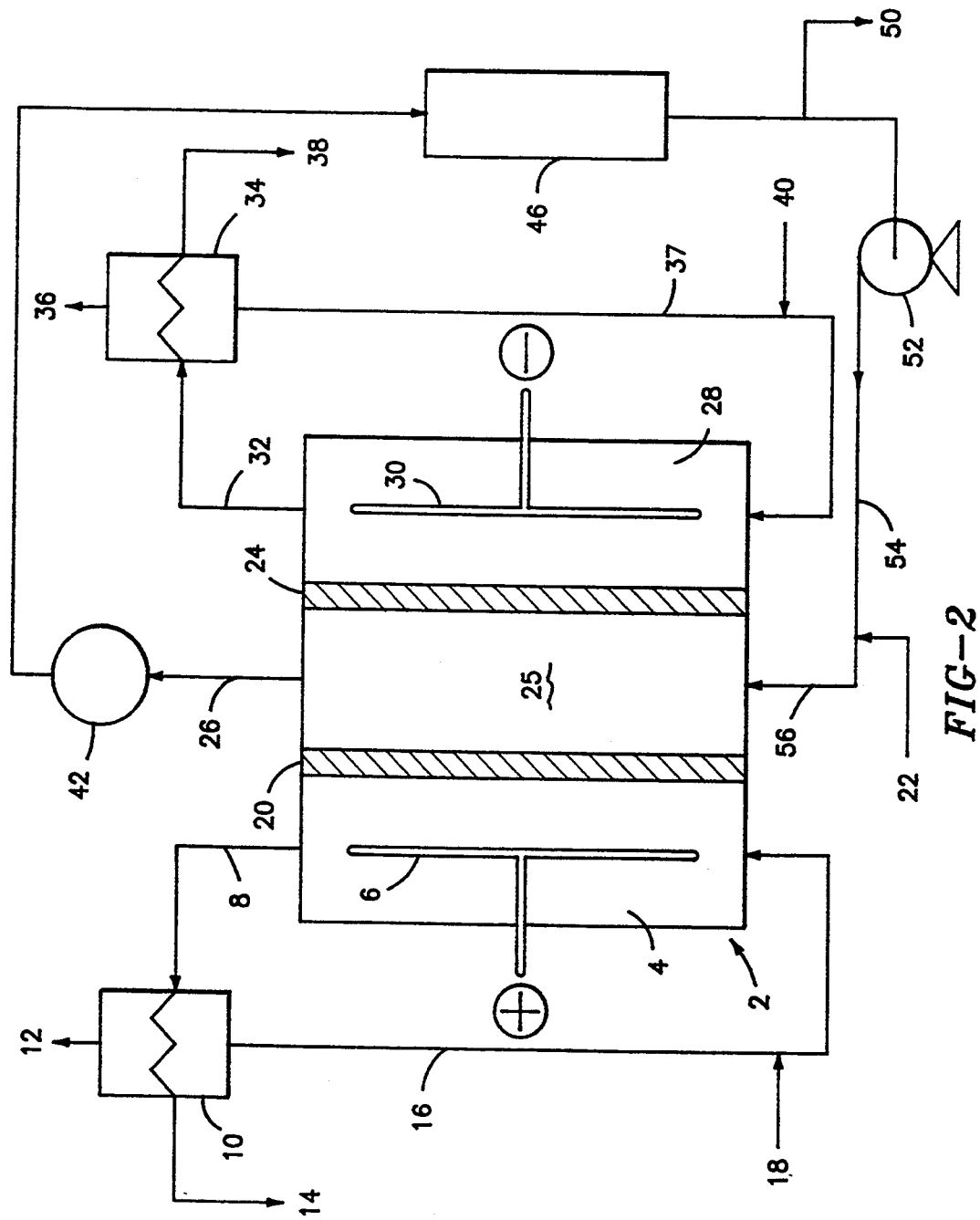
FIG. 2 schematically illustrates one embodiment of the process of the present invention embodiment of the process of the present invention employing bipolar membranes.

FIG. 2 also depicts electrolytic cell (2) comprises an anolyte compartment (4), a catholyte compartment (28), and a central ion exchanging compartment (25) situate therebetween. However, FIG. 2 shows a general HAN neutralization process system employing a recirculating HAN solution stream (54) that recirculates by means of a pump (52). A HAN feed solution (22) containing the excess residual nitric acid is introduced via recirculating stream (56) into the bottom of the ion exchanging compartment (25) and is evenly flow distributed through small distributor holes (not shown) into the central ion exchanging compartment (25). The excess nitric acid in the HAN is depleted as the solution flows upward in the compartment (25). The nitric acid depleted HAN solution (26) then exits through small distribution exit holes (not shown) at the top of the ion exchanging compartment (25) and then out from the electrolytic cell (2). A pH sensor (42) is used to monitor the pH of the recirculating aqueous HAN solution and a heat exchanger (46) is used to cool the aqueous circulating HAN product. The anolyte and catholyte compartments (4,28) both have recirculation systems (16,37) with input anolyte and catholyte feeds (18,40) and gas disengagers (10,34). The nitric acid depleted HAN solution product stream (50) is removed from the recirculating HAN solution stream (54) downstream of the heat exchanger (46). By-product streams include ammonium hydroxide effluent stream (38), oxygen stream (12), hydrogen stream (36), and a nitric acid stream (14) suitable for recycle.

Figure 3:
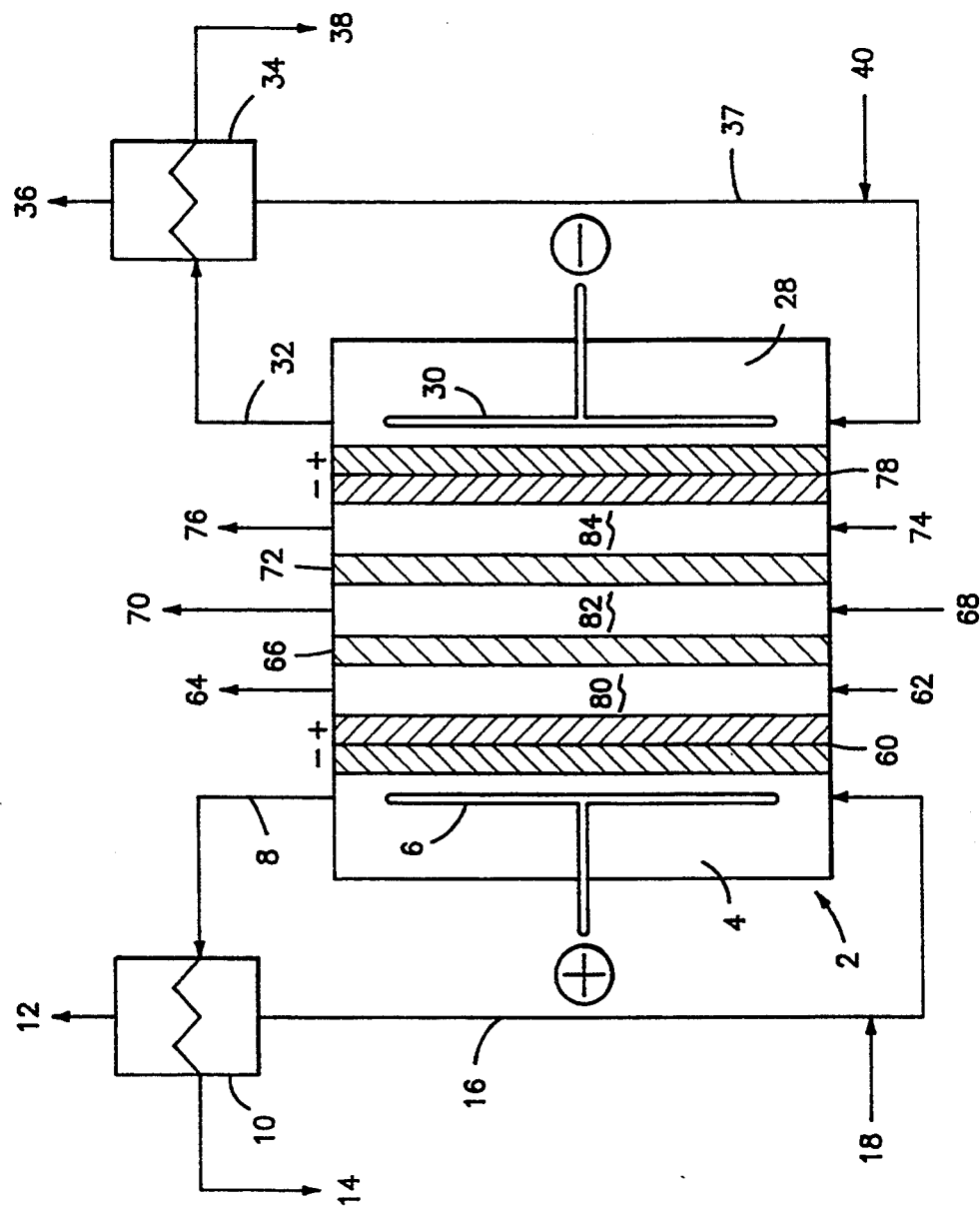

In another embodiment of the invention, as shown in FIG. 3, the electrolytic cell (2) utilizes bipolar membranes to replace gas evolving anodes and cathodes in the intermediate compartments of a cell stack. Bipolar membranes generate hydrogen ions and hydroxyl ions by splitting water at its cationic (+) and anionic faces (−) respectively in the electrochemical electrical potential field in the cell. The advantage in using bipolar membranes is that there is a significant reduction in the operating cell voltage in comparison to gas evolving electrodes. The uses and function of bipolar membranes are well known in the art in its use in electrochemical electrodialysis systems.

A general cell stack arrangement is shown in the electrolytic cell (2) shown in FIG. 3 which illustrates a unit cell located between the end electrode compartments. The cell stack (2) uses a typical anode compartment (4) and a cathode compartment (28) containing electrodes and electrolyte solutions. These are located at the ends of the cell stack to where the electrical connections to the cell are made. The unit cells in the stack between these end electrode components using bipolar membranes comprise three compartments, an acid compartment (80), a central ion exchange compartment (82), and a base compartment (84). The acid compartment is analogous to an anolyte compartment except that the bipolar membrane (60) cation face in acid compartment (80) produces hydrogen ions but no oxygen gas. The nitric acid containing feed solution (68) is fed into ion exchange compartment (82) with the nitric acid depleted stream exiting the compartment as stream (70). Nitrate ions pass through the adjoining anion permeable membrane (66) from central ion exchange compartment (82) into acid compartment (80) and combine with the hydrogen ions to produce nitric acid. Process stream (62) is a deionized water and/or recirculating nitric acid stream entering acid compartment (80) and exiting as stream (64). Compartment (84) is the base compartment where small quantities of protonated hydroxylamine are transported through anion permeable membrane (72) from ion exchange compartment (82). Hydroxyl ions are produced by the anion face of bipolar membrane (78) and combine with any protonated hydroxylamine and pass through anion permeable membrane (72) into central ion exchange compartment (82). Stream 74 is a deionized and/or recirculating input stream to base compartment (84) solution and exits as stream (76).

In other embodiments of the present invention, the electrolytic cell stack design (as illustrated by FIG. 3) can be configured to contain up to 200 of these cell units between the end electrode compartments. The input and output streams of the acid compartment are all suitably connected or manifolded into a pumped recirculation system, having, in addition to the acid compartment, a base compartment together with its input and output streams, and the central ion exchange compartment together with its input and output streams, analogous to those described above in connection with FIG. 3.

The two process control features required in the electrochemical cell operation are pH and temperature. The pH of the solution leaving the electrochemical cell is used to monitor the neutralization of the aqueous HAN to the pH or residual nitric acid concentration requirements for the final product specification. Alternatively, an on-line pH titrator can be used to monitor/analyze the residual nitric acid in the product solution. The product solution temperature from the electrochemical cell is controlled by a heat exchanger to minimize HAN solution decomposition which occurs at high temperatures.

In operation, the electrochemical cell employed in the process of the present invention suitably employs an operating temperature of between about $-10°$ C. and about $100°$ C., with a preferred operating temperature range of $-5°$ C. to $80°$ C. (more preferably between $5°$ C. to $60°$ C.), in order to avoid or reduce HAN losses due to thermal decomposition in the central ion exchanging compartment.

Although the concentration of HAN relative to nitric acid that is suitably employed in the process of the present invention can vary over a wide range, typical ranges are between about a 0.1 and about a 6 molar HAN solution containing between about a 0.01 and about a 5 molar excess nitric acid. High concentrations of excess nitric acid in the HAN requires more extensive processing, and therefore a minimum excess of nitric acid (preferably not exceeding about 10% by weight) is preferred in the HAN solution feed to the process.

Using the process of the present invention, the typical ammonium hydroxide byproduct concentration in the catholyte is between about 0.001 and about 20 weight percent ammonium hydroxide, with a preferred range being between about 0.1 and about 10 weight percent. The ammonium hydroxide concentration will depend on the membrane performance characteristics and the extent of transport of protonized hydroxylammonium into the catholyte compartment.

An advantageous thickness or spacing range for the central ion exchange compartment is between about 0.05 and about 100 cm, with a preferred range being between 0.1 and 25.0 cm spacing between the membranes. A thin spacing to reduce IR drop is most preferred (0.1 to 5 cm). A much more current-efficient cell design would employ two or more ion exchanging compartments between the anode and cathode operated with a series flow arrangement to increase the current efficiency of the electrolytic cell. Alternatively, the central ion exchanging compartment can be filled with anion ion exchange resin material to help increase electrolytic current efficiency by adsorbing nitrate anions from the HAN solution and then releasing them by regeneration with the $OH^-$ ion stream coming from the catholyte compartment. The use of the ion exchange fill media in the central ion exchanging compartment is especially useful for treating low nitric acid concentration HAN solutions.

The anolyte feed is preferably a 0.1 to 18 megohm-cm quality deionized water feed, and 1 to 18 megohm-cm deionized water quality is most preferred for the feed addition in order to reduce the potential introduction of metallic or inorganic impurities into the HAN product solution in the central ion exchanging compartment. The anolyte nitric acid concentration should be kept in a suitable range to obtain adequate electrolyte conductivity in the anode compartment.

Other suitable anolytes are about 0.01 to 20 wt % solutions of non-oxidizable acids such as nitric acid, sulfuric acid, perchloric acid, and phosphoric acid. When using nitric acid, a concentration range of between about 0.5 and 10 wt % nitric acid, based upon the weight of the aqueous anolyte, is the preferred range of acid concentration in the anolyte.

The anolyte compartment can be alternatively filled with a strong acid, sulfonic acid functionality-containing ion exchange resin electrolyte, together with the addition of deionized water as the anolyte.

In use, the electrolytic cell operating current density is preferably between about 0.01 and 10 $KA/m^2$ (kiloamps per square meter), with a more preferred range being within the range of 0.05–5 $KA/m^2$. A constraint on current density is the requirement to keep the operating temperature in the central ion exchanging compartment sufficiently low so as to minimize HAN decomposition.

The HAN solution feed flow rate utilized in the electrochemical cell should provide and average velocity of the flow in the range of between about 0.01 and about 5.0 ft/sec (which corresponds to between about 0.03 to about 152 cm/sec. The process is suitable for processing over a wide range of flow rates ranging from very slow flows, on the order of a gm/min, to flows very fast flows of greater than 100 to 1000 gallons per minute with process scale-up.

The materials of construction for the membranes employed in the process of the present invention can vary over a wide range. Oxidation and high temperature resistant membranes are preferred. Among these are perfluorinated backbone based anion membranes such as those produced by TOSOH Corporation (Tokyo, Japan) under the tradename of TOSFLEX ®, whose preparation is described in U.S. Pat. Nos. 4,567,206, 4,659,744, and 4,661,231. Other perfluorinated membranes with polytetrafluoroethylene (PTFE) based backbones with quaternary amine functional groupings such as those manufactured by Raipore are also suitable. All of the membranes employed can be reinforced or unreinforced types.

Hydrocarbon based membranes have also been found to be suitable depending on their stability at the operating parameters of the cell such as temperature and nitric acid concentration. Suitable types are those manufactured by Tokuyama Soda under the brand name of NEOSEPTA ®, by Sybron Chemicals Inc. under the brand name of IONAC ®, and Hydro Components, Inc. under the brand name of PERMION ®, among others.

Commercially available diaphragm type separators may also be employed in the process electrolytic cell to demarcate the anolyte or catholyte positions from the central ion exchange compartment, although anion exchange type membranes are preferred.

Materials of construction for the anode spacers and for the gas disengagement apparatus suitably comprise a thin protective spacer material such as a chemically resistant plastic mesh which can be put between the membrane and the anode surface to provide for the use of expanded metal anodes. A spacer can also be used to allow for gas disengagement behind the anode. Suitable construction materials are corrosion resistant plastics such as polyvinylchloride (PVC), polyethylene, polypropylene, fluoropolymers such as polyvinylidiene difluoride (PVDF), polytetrafluoroethylene, such as Dupont's TEFLON ® brand, among others, meeting the requirement that they be resistant to degradation by nitric acid and HAN.

In a preferred embodiment of the present invention, an anode oxygen evolution electrocatalyst coating is preferably employed in order to facilitate oxygen evolution at the anode. Suitable electrocatalysts include iridium oxide based type coatings on titanium or any suitable valve or oxide forming metal such as niobium, tantalum, tungsten, niobium, hafnium, zirconium, or vanadium, or like metal that is stable in nitric acid in the form of an electrolytic electrode structure. Suitable -iridium oxide based coatings are those manufactured by Englehard (PCMA 1510) or Eltech (TIR-2000).

In other embodiments of the present invention, there are many other types of anode coatings that can be used and their performance is a function of the cell operating current density and anolyte solution composition. Other suitable anode coating types are plated or clad platinum on valve metal structures or platinum group oxide type, or combinations thereof, coatings on valve metals. Platinum clad niobium anodes are a preferred type since the HAN electrochemical production process typically commercially uses this type of anode and therefore its use for nitric acid removal from HAN would not introduce additional transition metals to the process solution. Other useful platinum group metals include gold, silver, ruthenium, rhodium, iridium, palladium, osmium, combinations thereof, and the like, in the form of the metals, alloys, oxides thereof, or combinations thereof.

Perovskite or ceramic-based electrodes and coatings of this type made from transition metal type oxides prepared from cobalt, iron, chromium, and the like, and combinations thereof may also be suitably employed if they are stable in nitric acid electrolytes and do not release metal contaminants (preferably not even trace metal contaminants) into the nitric acid or HAN solutions. Another type of suitable anode coating or structure are the conductive Magneli phase titanium suboxides (i.e., $Ti_4O_7$, $Ti_5O_9$, and the like) composition materials, such as those sold under the tradename of EBONEX ®, as well as the platinum group metals, alloys, and oxides thereof, coatings over these structures, as described above.

The preferred materials of construction for the cathode are stainless steel types such as 304, 316, 310, 400 series, nickel and nickel alloys, graphite, carbon, the Magneli phase titanium suboxides, and the like. The cathode can be in an expanded, perforated felt, woven felt or sintered fiber form, or fine screen wire form to allow for hydrogen bubble release from between the membrane and cathode structure.

In order to reduce or minimize the possibility of transition metal contamination of the HAN solution in the central ion exchanging compartment, the cathode may optionally have a thin metallic coating applied to the cathode surface mounted directly against the membrane. Suitable metals are metals such as platinum or gold.

Other suitable cathode materials are high surface area cathode structures made from iron or steel, graphite, carbon copper, and other transition metals. The cathode electrode structure is preferred to be a long life type, in other words, a non-sacrificial type of cathode. The cathode itself can also be coated or plated with oxides such a ruthenium and other precious metal oxides to reduce the hydrogen overvoltage of the selected cathode material.

A high surface area cathode structure can be formed from the above materials in the form of felts, matted fibers, semi-sintered powders, woven cloths, foamed structures, multiple layers of thin expanded or perforated sheets, and the like.

The high surface area cathode structures can be sintered to the cathode current distributor backplate as a unit structure used in the cell construction. A removable structure is preferred for ease in cathode structure replacement when required.

The central ion exchanging compartment suitably optionally contains an anion or cation exchange resin fill media. Functionality groups on the anion exchange media which may be employed in the ion exchange compartment include strong base and weak base types having primary, secondary, tertiary and quaternary amine end groups. Strongly basic and weak anion ion exchange resins are preferred. Various percentage mixture of resins in the regenerated and nonregenerated form may be used in various sections of the ion exchange compartments on assembly to compensate for swelling and contraction of the resins during cell operation. For example, percentage ratios of regenerated form to nonregenerated form may include those from 50% to 100%.

The preferred resins are suitably ionically conductive so that a practical amount of current can be passed through the separation cell. Preferred are the gel-type strong base type ion exchange resins which are polystyrene based with divinyl benzene (DVB) crosslinking for support. High surface area macroreticular or macroporous type ion exchange resins are also suitable so long as the crosslinking is low (about 5%) and suitably conductive for use in the separation cell. Some weakly anion exchange resins, such as those commercially available as Type II anion resins, having different anion functional end groupings, also have been found to have a reasonable ionic conductivity in previous type of cell designs.

The anion exchange resins optionally and preferably employed in the ion exchange compartment serve as an active mediator which can exchange or absorb anions such as nitrate as well as hydroxide ions. The hydroxide ions generated in the cathode compartment help regenerate the resin in the ion exchange compartment continuously, neutralizing the hydrogen ions to form water and releasing nitrate anions to pass through into the anolyte compartment through the separator or anion exchange membrane. The use of anion exchange resins are particularly beneficial when feeding dilute HAN solutions or when the conductivity of the solution is low due to reduced concentrations of nitric acid as it helps to reduce the cell voltage due to electrical resistance and increases the conversion efficiency by acting as an active storage reservoir for nitrate and hydroxide anions.

Illustrative of suitable anion exchange resins are those having substrates and structural backbones of polystyrene crosslinked with divinylbenzene, cellulose based, fluorocarbon based, methacrylate or acrylic based and other synthetic polymeric types and the like. Preferred are anion exchange resin media that are suitably ionically conductive when used in the ion exchange compartment such that they can conduct a practical amount of current in the electrolytic cell. Preferred as anion exchange media are weak base and strong base anion ion exchange resins which have a low to moderate crosslinking with a gel or high surface area macroreticular or microporous physical structure. Strong base anion ion exchange resins are as exemplified by Rohm and Haas Co.'s AMBERLITE® brand IRA-400, IRA-410, IRA-900, IRA-910 as well as Mitsubishi Chemical Industries Ltd. DIAION® brand SA-10A, PA-306, PA-306. Weak base anion ion exchange are as exemplified by Rohm and Haas AMBERLITE® brand IRA-68 and Mitsubishi Chemical Industries Ltd. DIAION® brand WA-10 and WA-20. Other strong and weak base ion exchange resins are also available from other suppliers such as Dow Chemical and Purolite. Where more than one ion exchange compartment is employed, the type of anion exchange medium selected can be different for each compartment to optimize removal of the nitric acid and nitrate ion. In addition, different ion exchange resin can be used as mixtures or employed in specific sections of the ion exchange compartment(s) to maximize anion removal efficiency in the electrolytic process.

Suitable cation exchange resins include, for example, low crosslinked, strong acid cation ion exchange resins, such as Rohm and Haas Co.'s AMBERLITE® brand IRC-118, as well as the more highly crosslinked AMBERLITE® brand IRC-120 resins. Also useful are the gel-type strong acid type ion exchange resins which are polystyrene based with divinyl benzene ("DVB") crosslinking for support. High surface area macroreticular or macroporous type ion exchange resins are also useful, particularly those having good ionic conductivity for compartments, as illustrated by Rohm and Haas Co.'s AMBERLYST®-19 and AMBERLYST®-31 cation resins, as well as Mitsubishi's tradename DIAION® cation resins.

Physical forms of the anion or cation exchange resin which can be used are those which can be packed into compartments and include beads, rods, fibers or a cast from with internal flow channels. Resin bead forms of the resin are preferred and most readily available. Thus, the preferred form of ion exchange resin is a bead type, although other forms may be used so long as they can be packed into the anion exchange compartments. Smaller size ion exchange resins have a greater equilibrium absorption rate for the cation catalyst ions, but they also have a greater pressure drop per unit flow. Other ion exchange forms such as rods, or a cast form of ion exchanger mass with internal flow channels can be also be used.

Because nitric acid is a strong oxidizer, the ion exchange resin selection and use should be carefully chosen and controlled due to the possibility of oxidation or decomposition if the resin is dried or if strong nitric acid is introduced accidently into the resin.

The ion exchange forms employed in the initial assembly of the unit may suitably contain a ratio mixture of both hydroxide form and nitrate forms in order to compensate for the swelling and contraction of the resins due to the nitric acid/HAN feed. Percentage ratios of hydroxide to nitrate forms may range from 50 to 100%.

Other anion ion exchange functionalities on various other substrates and backbones can also be used in the separation cell as the ion exchange medium. These would include cellulose based and other synthetic polymeric types that may be available.

Anion ion exchange membranes selected as separators between compartments are those which are inert membranes, and are substantially impervious to the hydrodynamic flow of the HAN solution or the electrolytes and the passage of any gas products produced in the anode or cathode compartments.

Anion exchange membranes are well-known to contain fixed anionic groups that permit intrusion and exchange of anions, and exclude cations from an external source. The resins which can be used to produce the membranes include, for example, fluorocarbons, vinyl compounds, polyolefins, hydrocarbons, acrylics and copolymers thereof. Preferred are anion exchange membranes such as those comprised of fluorocarbon polymers or vinyl compounds such as divinylbenzene having a plurality of pendant quaternary amine, tertiary amine, secondary amine, and primary amine end groups or mixtures of these groups.

Suitable anion exchange membranes are readily available, being sold commercially, for example, by Ionics, Inc., by Sybron under the trademark IONAC®, by the Asahi Chemical Company under the trademark ACIPLEX®, and by Tokuyama Soda Co. under the trademark NEOSEPTA®. Among these are also the perfluorinated anion type membranes which have a perfluorinated resin backbone to which are grafted the functional groups such as those sold under the RAIPORE® tradename by RAI Research Corporation.

The electrochemical cell described above can be operated in a single pass-through design or in a fast feed recirculation type operation to achieve optimum reduction or removal of the nitric acid from the aqueous HAN solution to achieve the required residual concentration, as may be desired. The cell can also be arranged in a bipolar cell type arrangement using a solid plate type anodes/cathodes. The electrode could use a titanium or niobium sheet clad to stainless. The titanium or valve metal side would be coated with an oxygen evolution catalyst and would serve as the anode side. The other stainless side would be the cathode side. In this design there would be separators/spacers between the membranes and electrodes to provide gas release zone. An alternative anode/cathode combination is a platinum clad layer on stainless steel or niobium or titanium which is commercially available and is prepared by heat/pressure bonding. The platinum layer is preferably about 125 to 250 microinches thick in order to reduce cost.

In a preferred embodiment described above in conjunction with FIG. 3, the electrochemical cell is suitably configured in a bipolar cell type arrangement. For treatment of HAN/nitric acid solutions with a low conductivity, a cell design using an internal electrolyte distribution may be used. Likewise, and most importantly, bipolar membranes can be used in place of intermediate electrodes in an electrolytic cell stack, where hydrogen and hydroxide ions are generated from water splitting at the bipolar membrane interfaces.

The novel electrochemical neutralization process can be integrated into a commercial electrolytic HAN production process, thereby providing a method for recycling the removed excess nitric acid in the HAN solution and reducing the amount of waste generated from the process.

EXAMPLES

General Procedure

An electrochemical cell was assembled as shown in FIG. 1 consisting of an anode compartment, cathode compartment, and a central ion exchanging compartment with the compartments separated by two anion permeable ion exchange membranes.

The anolyte and catholyte compartments were machined from 1.0 inch (2.54 cm) thick Type I PVC. The outside dimensions of both the anolyte and catholyte compartments were 5.0 inches (12.7 cm) by 14.0 inches (35.56 cm) with machined internal dimensions of 3.0 inches (7.62 cm) by 12 inches (30.48 cm) by 0.250 inch (0.635 cm) deep. Flow entry and exit ports as well as flow distributions holes were drilled from the outside of the frame to the central recess area for flow into and out of the two electrode compartments.

A central ion exchange compartment was machined from 1.0 inch (2.54 cm) thick Type I PVC with outside dimensions of 5.0 inches (12.7 cm) by 16 inches (40.64 cm) to a ⅛" (0.317 cm) by 5.0 inch (12.7 cm) by 14 inch (35.56 cm) thick center area with a central 3 inch (7.62 cm) by 13 inch (33.02 cm) area cutout. The 1.0 inch (2.54 cm) by 1.0 inch top and bottom ends were drilled with a single central hole to form entry/exit ports and tapped to accept ¼ inch NPT pipe thread fittings. A series of 0.055 inch (0.1397 cm) holes were drilled every ½ inch (1.27 cm) from the central cutout area into the flow distribution hole in the 1.0 inch by 1.0 inch entry/exit ends of the ion exchange compartment frame. These flow distribution holes go through the ⅛ inch thickness of the central part of the frame.

The anolyte compartment was fitted with a flattened expanded titanium sheet anode having a 2.0 micron electroplated platinum electrocatalytic coating and external dimensions of 0.060 inch (0.1524 cm) thickness by 3 inch (7.62 cm) width by 12 inch (30.48 cm) long. Two ¼ inch (0.635 cm) diameter titanium current conductor posts were welded back to the back side of the expanded titanium anode mesh for current conductor leads which extended out through holes in the recess area to the outside of the anode compartment frame using ¼" NPT tubing fittings as the fluid sealing means. The anode mounting into the recess inside the anolyte compartment was completed using one or more layers of 1/16 inch (0.1588 cm) thick expanded polytetrafluorethylene mesh behind the anode as a gas/liquid disengager and a single layer on top of the anode so that the mesh surface was flush with the outside of surface of the anolyte compartment.

The catholyte compartment was fitted with a 0.060 inch (0.1524 cm) thick by 3 inch (7.62 cm) by 12 inch (30.48 cm) type 316L stainless steel perforated plate having two ½ inch (1.27 cm) diameter 316L stainless conductor posts welded on the back side. The perforated stainless cathode surface was plated with a 2.0 micron thickness platinum layer for reducing cathode corrosion against the membrane. The cathode plate was also mounted in the recess inside the catholyte compartment using one or more layers of 1/16 inch (0.1588 cm) thick expanded polytetrafluorethylene mesh behind the perforated cathode for gas/liquid disengagement so that the cathode surface was flush with the external surface of the anode compartment.

The cell construction was completed mounting two 0.0625 inch (0.15875 cm) expanded polytetrafluorethylene mesh spacers in the thickness of the ion exchange compartment to provide for physical internal spacing in the compartment and to provide for some mass transfer flow promoting turbulence. Two anion permeable ion exchange membranes were positioned on either side of the ion exchanging compartment. The anion membranes used were a hydrocarbon-based PERMION A2000 obtained from Hydro Components, Inc. (Blue Bell, Pa.). A 0.020 inch (0.5008 cm) thick GORE-TEX brand compressible polytetrafluorethylene gasket tape (a trademarked product of W. L. Gore & Associates, Elkton, Md.) was used on the sealing surfaces of the electrode compartments and ion exchange compartment on final cell assembly. Steel tie bolts and steel endplates provided the compression force for gasket sealing.

In the experiments below, 18 megohm-cm deionized water was metered through two rotameters into the anode and cathode compartments at various flowrates. Aqueous HAN solutions containing residual nitric acid was pumped with a fluoropolymer based positive displacement pump at flowrates between about 200 to 300 ml per minute into the bottom of the ion exchange compartment. The HAN product solution flowed out of the top of the central ion exchange compartment through an in-line pH sensor and into a jacketed 250 ml glass reservoir heat exchanger. The HAN solution product was cooled in the reservoir to controlled temperatures. The nitric acid depleted HAN in the reservoir then overflowed and was pumped back into the ion exchange compartment with the positive displacement pump. The HAN solution was recirculated until the final aqueous solution pH reached a specified value.

The HAN solution volumes and concentrations were measured and analyzed at the beginning and at the end of each run. The anolyte and catholyte liquid volumes were also collected during the run with the anolyte analyzed for nitric acid and the catholyte for ammo- was calculated to be 8.3%. The experimental data is given in Table I.

TABLE I

Anion Membranes: PERMION 1000
Anode Type: Platinum Plated Titanium
Cathode: Platinum Plated Perforated 316 Stainless

| TIME INTO RUN IN HOURS | CELL OPERATION AMPERES | VOLTS | HAN IN RECIRCULATION TANK HAN CONCENTRATION Moles/Liter | HNO3 CONCENTRATION Moles/Liter | pH | TEMP °C. | ION EXCHANGE HAN CONCENTRATION Moles/Liter |
|---|---|---|---|---|---|---|---|
| 0.00 | 20.00 | 14.00 | 3.220 | 0.774 | <0 | 23 | NT |
| 1.00 | 20.00 | 10.25 | 3.140 | 0.596 | <0 | 31 | 3.04 |
| 2.00 | 20.00 | 10.16 | 3.010 | 0.426 | <0 | 33 | 2.99 |
| 3.00 | 20.00 | 10.20 | 3.030 | 0.255 | <0 | 34 | 2.97 |
| 4.00 | 20.00 | 10.28 | 2.970 | 0.132 | 0.53 | 34 | 2.95 |
| 5.00 | 20.00 | 10.43 | 2.93 (Est.) | NT | 3.34 | 34 | 2.93 (Est.) |
| 6.00 | 20.00 | 10.48 | 2.91 | NT | 4.22 | 35 | 2.91 |

| TIME INTO RUN IN HOURS | COMPARTMENT OUTPUT HNO3 CONCENTRATION Moles/Liter | ANOLYTE OUTPUT pH | CATHOLYTE OUTPUT pH |
|---|---|---|---|
| 0.00 | 0.774 | NT | NT |
| 1.00 | 0.556 | 0.06 | 10.27 |
| 2.00 | 0.385 | 0.06 | 10.41 |
| 3.00 | 0.242 | 0.02 | 10.33 |
| 4.00 | 0.102 | 0.03 | 10.19 |
| 5.00 | NT | 0.08 | 10.37 |
| 6.00 | NT | 0.02 | 10.31 |

| | | Solution Sp. Gr. | ANOLYTE ANALYSIS Moles HAN | Wt % HNO3 | Moles HNO3 | CATHOLYTE ANALYSIS Wt % NH4OH | Moles NH4OH |
|---|---|---|---|---|---|---|---|
| Start Volume of HAN Solution: | 2.000 liters | NT | 6.440 | NT | NT | NT | NT |
| Final Volume of HAN Solution: | 2.030 liters | 0.91 | 5.907 | NT | NT | NT | NT |
| Total Anolyte Collected: | 2.125 liters | 1.04 | NT | 5.565 | 1.924 | NT | NT |
| Total Catholyte Collected: | 1.455 liters | 0.99 | NT | NT | NT | 0.070 | 0.029 |

Calculated Cumulative % CE Based on HNO3 Removal From HAN Solution: 34.6%
% HNO3 Removal From HAN: 100.0%
Calculated Cumulative Total HAN Loss Based on HAN Analysis: 8.3% nium hydroxide using an automated titrator.

Example 1

In this experiment, PERMION ® 1000 hydrocarbon based anion membranes (a product of Hydro Components, Inc.) were mounted on either side of the ion exchange compartment. The HAN feed solution was recirculated through the cell until the HNO3 depleted HAN final product solution pH reached about 4.0. The cell operating current density was 0.86 KA/m$^2$. The cell cumulative current efficiency was 34.6% based on the nitric acid collected in the anolyte and the HAN loss

Example 2

In this experiment, the HAN solution was kept at a lower temperature of about 14° C. at a cell operating current density of 0.86 KA/m$^2$. The cell voltage was higher than in Example 1. The aqueous HAN solution product final pH was 4.55. The cumulative cell current efficiency was 23.1% based on the nitric acid collected in the anolyte. The estimated total HAN product loss was 8.35%. The experimental data is given in Table II.

TABLE II

Anion Membranes: PERMION 1000
Anode Type: Platinum Plated Titanium
Cathode: Platinum Plated Perforated 316 Stainless

| TIME INTO RUN IN HOURS | CELL OPERATION AMPERES | VOLTS | HAN IN RECIRCULATION TANK HAN CONCENTRATION Moles/Liter | HNO3 CONCENTRATION Moles/Liter | pH | TEMP °C. | ION EXCHANGE HAN CONCENTRATION Moles/Liter |
|---|---|---|---|---|---|---|---|
| 0.00 | 20.00 | 8.00 | 3.202 | 0.767 | <0 | 23 | 3.202 |
| 1.00 | 20.00 | 12.56 | 2.724 | 0.425 | 0.01 | 16 | 2.750 |
| 2.00 | 20.00 | 12.80 | 2.775 | 0.227 | 0.24 | 14 | 2.700 |
| 3.00 | 20.00 | 12.81 | 2.65 (Est.) | 0.000 | 0.82 | 14 | 2.65 (Est.) |
| 4.00 | 20.00 | 12.97 | 2.640 | 0.000 | 4.55 | 14 | 2.640 |

| TIME INTO RUN IN HOURS | COMPARTMENT OUTPUT HNO3 CONCENTRATION Moles/Liter | TEMP °C. | ANOLYTE OUTPUT pH | CATHOLYTE OUTPUT M NNO3 |
|---|---|---|---|---|
| 0.00 | 0.767 | 23 | NT | NT |
| 1.00 | 0.413 | 19.5 | 0.02 | 1.238 |
| 2.00 | 0.207 | 19.5 | 0.59 | 1.224 |
| 3.00 | NT | 19.5 | 1.22 | 1.164 |

TABLE II-continued

Anion Membranes: PERMION 1000
Anode Type: Platinum Plated Titanium
Cathode: Platinum Plated Perforated 316 Stainless

| | | | | | |
|---|---|---|---|---|---|
| 4.00 | | NT | 19.5 | 4.65 | 1.145 |

HAN Flowrate Through Ion Exchange Compartment: 300 ml/min
Analyte Deionized Water INput Flowrate: 2.02 ml/min
Catholyte Deionized Water Input Flowrate: 2.0 ml/min

| | Solution Sp. Gr. | ANOLYTE ANALYSIS | | | CATHOLYTE ANALYSIS | |
|---|---|---|---|---|---|---|
| | | Moles HAN | Wt % HNO3 | Moles HNO3 | Wt % NH4OH | Moles NH4OH |
| Start Volume of HAN Solution: | 0.900 liters | NT | 2.88 | NT | 0.690 | NT | NT |
| Final Volume of HAN Solution: | 0.990 liters | NT | 2.64 | NT | NT | NT | NT |
| Total Anolyte Collected: | 0.755 liters | 1.04 | NT | 0.000 | 1.164 | NT | NT |
| Total Catholyte Collected: | 0.390 liters | 0.99 | NT | NT | NT | 0.175 | 0.019 |

Calculated Cumulative % CE Based on HNO3 Removal From HAN Solution: 23.1%
% HNO3 Removal From HAN: 100.0%
Calculated Cumulative Total HAN Loss Based on HAN Analysis: 8.38%

Example 3 begin to significantly occur in achieving a higher pH endpoint. The experimental data is given in Table III.

TABLE III

Anion Membranes: PERMION 1000
Anode Type: Platinum Plated Titanium
Cathode: Platinum Plated Perforated 316 Stainless

| | | | HAN IN RECIRCULATION TANK | | | | ION EXCHANGE |
|---|---|---|---|---|---|---|---|
| TIME INTO RUN | CELL OPERATION | | HAN CONCENTRATION | HNO3 CONCENTRATION | | TEMP | HAN CONCENTRATION |
| IN HOURS | AMPERES | VOLTS | Moles/Liter | Moles/Liter | pH | °C. | Moles/Liter |
| 0.00 | 20.00 | 14.00 | 3.210 | 0.769 | <0 | 23 | 3.210 |
| 0.50 | 20.00 | 10.25 | 3.080 | 0.651 | <0 | 37 | 3.090 |
| 1.50 | 20.00 | 10.16 | 3.060 | 0.495 | <0 | 39 | 3.050 |
| 2.00 | 20.00 | 10.20 | 3.000 | 0.382 | <0 | 40 | 3.010 |
| 2.50 | 20.00 | 10.28 | 3.060 | 0.306 | 0.53 | 39 | NT |

| | TIME INTO RUN IN HOURS | COMPARTMENT OUTPUT HNO3 CONCENTRATION Moles/Liter | ANOLYTE OUTPUT pH | CATHOLYTE OUTPUT pH |
|---|---|---|---|---|
| | 0.00 | 0.769 | NT | NT |
| | 0.50 | 0.625 | 0.14 | NT |
| | 1.50 | 0.461 | 0.16 | NT |
| | 2.00 | 0.350 | 0.12 | NT |
| | 2.50 | NT | 0.19 | NT |

| | Solution Sp. Gr. | ANOLYTE ANALYSIS | | | CATHOLYTE ANALYSIS | |
|---|---|---|---|---|---|---|
| | | Moles HAN | Wt % HNO3 | Moles HNO3 | Wt % NH4OH | Moles NH4OH |
| Start Volume of HAN Solution: | 2.000 liters | NT | 6.42 | NT | NT | NT | NT |
| Final Volume of HAN Solution: | 2.065 liters | 0.91 | 6.32 | NT | NT | NT | NT |
| Total Acolyte Collected: | 0.860 liters | 1.04 | NT | NT | NT | NT | NT |
| Total Catholyte Collected: | 0.600 liters | 0.99 | NT | NT | NT | NT | NT |

Calculated Cumulative % CE Based on HNO3 Removal From HAN Solution: 48.6%
% HNO3 Removal From HAN: 59.0%
Calculated Cumulative Total HAN Loss Based on HAN Analysis: 1.57%

In this experiment, the cell operation was held near 40° C. with a final HAN product solution pH of 0.53. The cumulative cell current efficiency based on nitric acid removal was 48.6% and the HAN loss was only 1.57%. An estimated 59% of the nitric acid from the HAN was removed. This experiment shows that the current efficiency drops with the percentage of nitric acid in the HAN solution, and that the HAN losses

Example 4

In this experiment, the cell operation was near 13° C. with a final HAN product solution pH of 4.20. The cell current efficiency based on nitric acid removal was 24.2% and the HAN loss was 12.5%. The experimental data is given in Table IV.

TABLE IV

Anion Membranes: PERMION 1000
Anode Type: Platinum Plated Titanium
Cathode: Platinum Plated Perforated 316 Stainless

| | | HAN IN RECIRCULATION TANK | | | ION EXCHANGE |
|---|---|---|---|---|---|
| TIME INTO RUN | CELL OPERATION | HAN CONCENTRATION | HNO3 CONCENTRATION | TEMP | HAN CONCENTRATION |

TABLE IV-continued

Anion Membranes: PERMION 1000
Anode Type: Platinum Plated Titanium
Cathode: Platinum Plated Perforated 316 Stainless

| IN HOURS | AMPERES | VOLTS | Moles/Liter | Moles/Liter | pH | °C. | Moles/Liter |
|---|---|---|---|---|---|---|---|
| 0.00 | 20.00 | 10.68 | 3.147 | 0.802 | <0 | 23 | NT |
| 1.00 | 20.00 | 10.25 | 2.918 | 0.503 | <0 | 13 | 3.04 |
| 2.00 | 20.00 | 10.16 | 2.780 | 0.331 | 0.02 | 13 | 2.99 |
| 3.00 | 20.00 | 10.20 | 2.966 | 0.106 | 0.57 | 13 | 2.97 |
| 4.00 | 20.00 | 10.28 | 2.45 | 0.000 | 4.20 | 14 | 2.95 |

| TIME INTO RUN IN HOURS | COMPARTMENT OUTPUT HNO3 CONCENTRATION Moles/Liter | ANOLYTE OUTPUT pH | CATHOLYTE OUTPUT pH |
|---|---|---|---|
| 0.00 | 0.774 | NT | NT |
| 1.00 | 0.556 | 0.06 | 10.27 |
| 2.00 | 0.385 | 0.06 | 10.41 |
| 3.00 | 0.242 | 0.02 | 10.33 |
| 4.00 | 0.102 | 0.03 | 10.19 |

| | | Solution Sp. Gr. | ANOLYTE ANALYSIS | | | CATHOLYTE ANALYSIS | |
|---|---|---|---|---|---|---|---|
| | | | Moles HAN | Wt % HNO3 | Moles HNO3 | Wt % NH4OH | Moles NH4OH |
| Start Volume of HAN Solution: | 0.900 liters | NT | 2.832 | NT | NT | NT | NT |
| Final Volume of HAN Solution: | 1.010 liters | 0.91 | 2.478 | NT | NT | NT | NT |
| Total Anolyte Collected: | 0.650 liters | 1.04 | NT | 5.565 | 1.924 | NT | NT |
| Total Catholyte Collected | 0.450 liters | 0.99 | NT | NT | NT | 0.070 | 0.009 |

Calculated Cumulative % CE Based on HNO3 Removal From HAN Solution: 24.2%
% HNO3 Removal From HAN: 100.0%
Calculated Cumulative Total HAN Loss Based on HAN Analysis: 12.5%

Example 5

In this experiment, the cell operation was near 13° C. at a lower current density of 0.65 KA/m². The HAN final product solution pH was 4.20. The cumulative cell current efficiency based on nitric acid removal was 25.2% and the HAN loss was 5.0%. The experimental data is given in Table V.

TABLE V

Anion Membranes: PERMION 1000
Anode Type: Platinum Plated Titanium
Cathode: Platinum Plated Perforated 316 Stainless

| TIME INTO RUN IN HOURS | CELL OPERATION | | HAN IN RECIRCULATION TANK | | | TEMP °C. | ION EXCHANGE HAN CONCENTRATION Moles/Liter |
|---|---|---|---|---|---|---|---|
| | AMPERES | VOLTS | HAN CONCENTRATION Moles/Liter | HNO3 CONCENTRATION Moles/Liter | pH | | |
| 0.00 | 15.00 | NT | 2.942 | 0.836 | <0 | 23 | NT |
| 1.00 | 15.00 | 11.34 | 2.806 | 0.663 | <0 | 13 | 3.04 |
| 2.00 | 15.00 | 11.84 | 2.727 | 0.502 | 0.02 | 13 | 2.99 |
| 3.00 | 15.00 | 11.53 | 2.763 | 0.384 | 0.57 | 13 | 2.97 |
| 4.00 | 15.00 | 11.83 | 2.557 | 0.251 | 4.20 | 14 | 2.95 |
| 5.00 | 15.00 | 11.91 | 2.484 | 0.102 | 4.20 | 14 | 2.95 |
| 6.00 | 15.00 | 12.30 | 2.490 | 0.000 | 4.20 | 14 | 2.95 |

| TIME INTO RUN IN HOURS | COMPARTMENT OUTPUT HNO3 CONCENTRATION Moles/Liter | ANOLYTE OUTPUT pH | CATHOLYTE OUTPUT pH |
|---|---|---|---|
| 0.00 | 0.774 | NT | NT |
| 1.00 | 0.556 | 0.06 | 10.27 |
| 2.00 | 0.385 | 0.06 | 10.41 |
| 3.00 | 0.242 | 0.02 | 10.33 |
| 4.00 | 0.102 | 0.03 | 10.19 |
| 5.00 | 0.102 | 0.03 | 10.19 |
| 6.00 | 0.102 | 0.03 | 10.19 |

| | | Solution Sp. Gr. | ANOLYTE ANALYSIS | | | CATHOLYTE ANALYSIS | |
|---|---|---|---|---|---|---|---|
| | | | Moles HAN | Wt % HNO3 | Moles HNO3 | Wt % NH4OH | Moles NH4OH |
| Start Volume of HAN Solution: | 0.900 liters | NT | 2.648 | NT | NT | NT | NT |
| Final Volume of HAN Solution: | 1.010 liters | 0.91 | 2.515 | NT | NT | NT | NT |
| Total Anolyte Collected: | 0.650 liters | 1.04 | NT | 5.565 | 1.924 | NT | NT |
| Total Catholyte Collected: | 0.450 liters | 0.99 | NT | NT | NT | 0.070 | 0.009 |

Calculated Cumulative % CE Based on HNO3 Removal From HAN Solution: 25.2%
% HNO3 Removal From HAN: 100.0%
Calculated Cumulative Total HAN Loss Based on HAN Analysis: 5.0%

What is claimed is:

1. A process for electrolytically removing excess nitric acid from an aqueous hydroxylammonium nitrate solution containing an excess of nitric acid to form a nitric acid-depleted hydroxylammonium nitrate solution in an electrolytic cell having an anolyte compartment comprising an anode and an anolyte solution, a catholyte compartment comprising a cathode and aqueous catholyte solution, and at least one ion exchange compartment between the anode compartment and the cathode compartment, with the provisos that said catholyte compartment is separated from said ion-exchanging compartment by means of an anion permeable membrane and that said anolyte compartment is separated from said ion exchange compartment by a separator, optionally another anion permeable membrane, which comprises:
   (a) feeding said aqueous hydroxylammonium nitrate solution containing excess nitric acid into said ion-exchanging compartment,
   (b) electrolyzing said catholyte solution to produce hydroxyl ions in said catholyte compartment,
   (c) electrolyzing said anolyte solution to produce hydrogen ions in said anolyte compartment,
   (d) electrolytically passing said hydroxyl ions from said catholyte compartment through said anion permeable membrane into said ion exchange compartment and reacting said hydroxyl ions with said excess nitric acid to form water and nitrate ions,
   (e) electrolytically passing said nitrate ions from said ion exchange compartment through said separator into said anolyte compartment and combining said nitrate ions with said hydrogen ions to form nitric acid in said anolyte compartment, and
   (f) forming a nitric acid-depleted aqueous hydroxylammonium nitrate solution in said ion exchange compartment and removing said nitric acid-depleted aqueous hydroxylammonium nitrate solution from said ion exchange compartment.

2. The process of claim 1 wherein said ion-exchanging compartment additionally contains an ion exchange resin being selected from the group consisting of an anion or cation exchange resin.

3. The process of claim 1 wherein said nitric acid formed in step (e) is removed from said anolyte compartment for recycle or reuse of said nitric acid.

4. The process of claim 1 wherein said separator comprises an anion permeable membrane selected from the group consisting of perfluorinated-backbone membranes, hydrocarbon-backbone membranes, and combinations thereof.

5. The process of claim 1 wherein said anion permeable membrane is selected from the group consisting of perfluorinated-backbone membranes, hydrocarbon-backbone membranes, and combinations thereof.

6. The process of claim 1 wherein said electrolytic cell employs a current density of between about 0.1 and about 10 kiloamps per square meter.

7. The process of claim 1 which additionally comprises carrying out said process in a continuous fashion employing a recirculating hydroxylammonium nitrate stream containing excess nitric acid to provide a continuous process, and removing by-product nitric acid for reuse in a chemical or electrochemical reaction.

8. The process of claim 1 wherein said aqueous hydroxylammonium nitrate solution contains an amount of nitric acid not exceeding about 10% by weight.

9. The process of claim 1 wherein said process is employed to remove and recover between about 5% and about 100% by weight of the total or excess nitric acid from said nitric acid-containing composition, based upon the weight of said composition.

10. A batch or continuous process for electrolytically removing nitric acid from a mixture of an aqueous solution of hydroxylammonium nitrate containing excess nitric acid in an electrolytic cell having an anode compartment, a cathode compartment, and at least one central ion exchange compartment between the anode compartment and the cathode compartment, which comprises feeding said mixture into the central ion exchange compartment, electrolyzing an aqueous catholyte solution in the cathode compartment to generate hydroxyl ions, electrolyzing an anolyte solution in the anode compartment to generate hydrogen ions, electrolytically passing the hydroxyl ions from said cathode compartment through an anion permeable membrane into the central ion exchange compartment and reacting said hydroxyl ions with nitric acid in said mixture to form water and nitrate ions, electrolytically passing said nitrate ions from said ion exchange compartment through a separator into said anode compartment, and removing nitric acid-depleted hydroxylammonium nitrate from said central ion exchange compartment to provide a product containing a reduced amount of nitric acid.

11. The process of claim 10 wherein said central ion-exchange compartment additionally contains an ion exchange resin being selected from the group consisting of an anion or cation exchange resin.

12. The process of claim 10 wherein nitric acid is formed in said anode compartment and removed from said anode compartment for recycle or reuse of said nitric acid.

13. The process of claim 10 wherein said separator comprises an anion permeable membrane selected from the group consisting of perfluorinated-backbone membranes, hydrocarbon-backbone membranes, and combinations thereof.

14. The process of claim 10 wherein said anion permeable membrane is selected from the group consisting of perfluorinated-backbone membranes, hydrocarbon-backbone membranes, and combinations thereof.

15. The process of claim 10 wherein said electrolytic cell employs a current density of between about 0.1 and about 10 kiloamps per square meter.

16. The process of claim 10 which additionally comprises carrying out said process in a continuous fashion employing a recirculating hydroxylammonium nitrate stream Containing excess nitric acid to provide a continuous process, and removing by-product nitric acid for reuse in a chemical or electrochemical reaction.

17. The process of claim 10 wherein said mixture contains an amount of nitric acid not exceeding about 10% by weight.

18. The process of claim 10 which comprises contacting said nitrate ions in said anode compartment with a source of hydrogen ions in order to regenerate nitric acid.

19. The process of claim 10 wherein said electrochemical cell is in the form of a cell stack additionally comprising intermediate electrodes in the form of bipolar membranes to form an acid compartment, a central ion exchange compartment, and a base compartment in a bipolar cell configuration.

20. The process of claim 19 wherein said ion exchange compartments additionally contain an ion exchange resin.

21. The process of claim 19 wherein said acid compartment and said base compartment of said bipolar cell configuration additionally contain an ion exchange resin.

22. The process of claim 10 wherein said process is employed to remove and recover between about 5% and about 100% by weight of the total or excess nitric acid from said nitric acid-containing composition, based upon the weight of said composition.

* * * * *